US007539595B2

United States Patent
Georgi et al.

(10) Patent No.: US 7,539,595 B2
(45) Date of Patent: May 26, 2009

(54) METHOD FOR DETERMINING THE COORDINATES OF A WORKPIECE

(75) Inventors: Bernd Georgi, Oberkochen (DE); Andreas Lotze, Dresden (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 351 days.

(21) Appl. No.: 10/586,656

(22) PCT Filed: Jan. 12, 2005

(86) PCT No.: PCT/EP2005/000439

§ 371 (c)(1),
(2), (4) Date: Aug. 7, 2006

(87) PCT Pub. No.: WO2005/070567

PCT Pub. Date: Aug. 4, 2005

(65) Prior Publication Data

US 2007/0177716 A1 Aug. 2, 2007

(30) Foreign Application Priority Data

Jan. 26, 2004 (DE) .................. 10 2004 003 941

(51) Int. Cl.
*G06F 19/00* (2006.01)
*G06F 17/40* (2006.01)

(52) U.S. Cl. .............. 702/150; 33/501; 33/501.02; 33/501.03; 33/504; 33/549; 33/556; 356/614; 382/106; 702/94; 702/95; 702/105; 702/155; 702/187; 702/189

(58) Field of Classification Search ............ 33/501, 33/501.02, 501.03, 502, 504, 505, 548, 549, 33/551, 553, 554, 556; 250/307, 526, 306; 356/2, 600, 601, 614, 615, 621, 622, 625, 356/626, 627, 628, 630, 634, 635, 638; 382/100, 382/106, 108, 141, 152; 701/1, 33, 85, 94, 701/95, 97, 105, 127, 150, 152, 153, 155, 701/156, 157, 158, 159, 166, 167, 168, 170, 701/187, 189
See application file for complete search history.

(56) References Cited

U.S. PATENT DOCUMENTS 2,570,275 A * 10/1951 Reading .................. 33/1 M
(Continued)

FOREIGN PATENT DOCUMENTS

DE 19846885 7/2000
(Continued)

OTHER PUBLICATIONS

English Translation of International Report on Patentability for PCT/EP2005/000439, mailed Jan. 11, 2007.
(Continued)

*Primary Examiner*—Edward R Cosimano
(74) *Attorney, Agent, or Firm*—Neifeld IP Law, PC

(57) ABSTRACT

The invention relates to a method for determining the co-ordinates of a workpiece (9). According to said method: a first co-ordinate system, which has a fixed position in relation to the workpiece (9), is defined; first co-ordinates of the workpiece (9) are measured using a first co-ordinate measuring device (3); second co-ordinates of the workpiece (9) are measured using a second co-ordinate measuring device (5); and a common set of co-ordinates is generated from the first co-ordinates and the second co-ordinates in the first co-ordinate system or in a second co-ordinate system, which has a fixed position in relation to the workpiece (9). The method can be used in particular to determine co-ordinates of a plurality of workpieces (9) during and/or after the production and/or processing of the workpieces (9).

20 Claims, 4 Drawing Sheets

U.S. PATENT DOCUMENTS

| | | | | |
|---|---|---|---|---|
| 3,436,968 | A * | 4/1969 | Unger et al. | 73/433 |
| 3,513,444 | A * | 5/1970 | Miller et al. | 356/627 |
| 4,329,060 | A * | 5/1982 | Wilder | 356/623 |
| 4,615,093 | A * | 10/1986 | Tews et al. | 29/407.04 |
| 5,442,674 | A | 8/1995 | Picard et al. | |
| 5,497,007 | A | 3/1996 | Uritsky et al. | |
| 5,715,167 | A | 2/1998 | Gupta et al. | |
| 5,805,289 | A | 9/1998 | Corby, Jr. et al. | |
| 6,167,607 | B1 | 1/2001 | Pryor | |
| 6,341,153 | B1 | 1/2002 | Rivera et al. | |
| 6,973,738 | B2 * | 12/2005 | Kaneda et al. | 33/636 |
| 7,024,789 | B2 * | 4/2006 | Seichter et al. | 33/702 |
| 7,414,732 | B2 * | 8/2008 | Maidhof et al. | 356/601 |
| 2003/0112448 | A1 * | 6/2003 | Maidhof et al. | 356/603 |
| 2004/0015372 | A1 | 1/2004 | Bergman et al. | |
| 2004/0234025 | A1 | 11/2004 | Schroeder et al. | |

FOREIGN PATENT DOCUMENTS

| | | |
|---|---|---|
| DE | 10331419 | 1/2004 |
| WO | WO 01/88471 | 11/2001 |

OTHER PUBLICATIONS

PCT/ISA/210 and PCT/IPEA/409 for PCT/EP2005/000439.

esp@cenet DE10331419.

esp@cenet DE19846885.

* cited by examiner

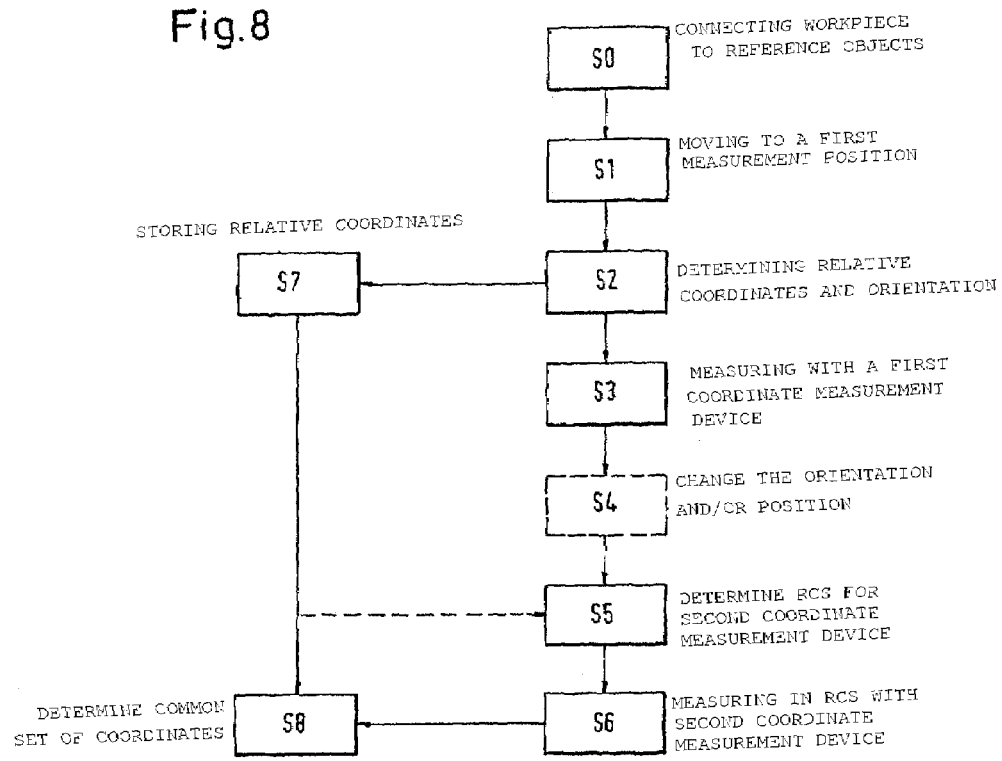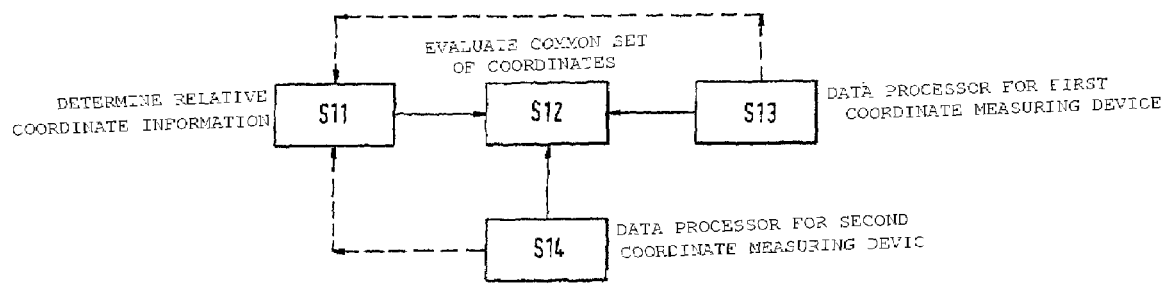

METHOD FOR DETERMINING THE COORDINATES OF A WORKPIECE

This application is a U.S. national stage entry of PCT/EP05/00439 filed Jan. 12, 2005, which claims priority to DE 10 2004 003 941.0 filed Jan. 26, 2004.

BACKGROUND OF THE INVENTION

The invention relates to a method and a measuring arrangement for determining coordinates of a workpiece.

In order, in particular, to be able to acquire dimensions and shape features of an object, use is made of coordinate measuring devices that scan one or more surfaces of the object (for example doing so optically without contact, or by contact scanning of the surface).

So called alternative measuring methods have been proposed, in which a measuring radiation produced by a radiation source penetrates the material of the object. For example, U.S. Pat. No. 6,341,153 B1 describes a system for nondestructive examination of parts, a three-dimensional computed tomography imaging method being applied. The system has a portable processor with a CAD/CAM program, a source of X-radiation, a scintillation screen and a silicon sensor field. The processor includes commands for producing an appropriate three-dimensional image in a coordinate system of the CAD/CAM program.

Particularly in the case of industrial mass production of workpieces, the requirement for high-precision, nondestructive measuring techniques that can be integrated in the fabrication line is increasing.

In this description, a workpiece is understood as any type of objects that are machined in a machining process and/or are produced and/or used in a production process. For example, the workpiece itself can be machined and/or can be combined with other workpieces during mounting.

The workpiece can also consist of various interconnected parts.

SUMMARY OF THE INVENTION

There is, furthermore, an increasing requirement not only of determining a few selected dimensions of the workpiece and their position relative to one another, but in any case of having the possibility of being able to measure even regions of the workpiece that are difficult to access. For example, the functional capacity of a workpiece can depend substantially on precisely observing the prescribed dimensions and formations in the region of a cavity.

Although it is true that measuring methods based on a measuring radiation that penetrates the material of the workpiece and whose intensity is measured can be used to obtain information relating to the position of such cavities, this information is fuzzy with reference to the coordinates of the material surfaces and any material transitions.

It is an object of the present invention to specify a method and a measuring arrangement for determining coordinates of a workpiece that enable different types of features of a workpiece to be measured, the aim being to enable optimization of the measurement outlay and of the measurement costs. In a particular refinement, the method or the measuring arrangement is to be suitable in conjunction with an acceptable economic outlay for measuring workpieces with hollow regions or ones that are difficult to access.

A method for determining coordinates of a workpiece is proposed in which a first coordinate system which is fixedly positioned with reference to the workpiece is defined, in which first coordinates of the workpiece are measured by using a first coordinate measuring device, in which second coordinates of the workpiece are measured by using a second coordinate measuring device, and in which a common set of coordinates in the first coordinate system or in a second coordinate system fixedly positioned with reference to the workpiece is generated from the first coordinates and from the second coordinates.

In particular, coordinates of a multiplicity of the workpieces can be determined during and/or after a production process and/or machining process of the workpieces.

It is possible by using various coordinate measuring devices to measure various types of features of the workpiece, to measure features of the workpiece with a different speed and/or accuracy, and/or to measure features that have been newly added during a production process of the workpiece solely with the aid of one of the coordinate measuring devices. More possibilities exist by comparison with measurement with the aid of only one coordinate measuring device. By dividing the features of the workpiece that are to be measured into features that are measured with the aid of the first and with the second coordinate measuring device, it is possible to optimize with regard to measurement costs, measuring precision and/or measuring speed.

It is preferred to apply different measurement principles for measuring the coordinates in the first coordinate measuring device and in a second coordinate measuring device. In particular, various classical measurement principles such as, for example, tactile scanning of surfaces, are taken into consideration.

For example, one of the coordinate measuring devices is a device with a probe that scans the workpiece while making contact with a surface and in this way determines the coordinates. Devices can also be used which scan the surface of the workpiece without making contact (for example, optical scanning of surfaces, in particular by means of the so called stripe or grating projection).

It is preferred to make use as the other one of the coordinate measuring devices of a device that determines information relating to the workpiece by using radiation that penetrates the material of the workpiece and is attenuated and/or deflected in the process. Examples of this are computed tomography devices based on X-radiation, electron radiation and/or positron radiation. With such systems, in particular, the outer and inner contours of the workpiece are acquired in a fuzzy fashion, a transition from low gray scale values to high gray scale values, for example, representing a surface or edge of the workpiece. Again, the type of fuzziness that is determined, in particular, by the extinction and the diffraction of radiation is a function of the material of the workpiece. The invention is, however, not restricted to the use of such devices as the other coordinate measuring device. However, it is also possible, for example, to use devices which scan the surface of the workpiece without making contact and, for example, optically scan surfaces of the workpiece (in particular by means of the so called stripe or grating projection).

In a more general formulation, it is preferred to make use of a first coordinate measuring device that supplies more precise (first) coordinates of the contours acquired by it, and the second coordinates determined by the second coordinate measuring device are referred to a coordinate system fixedly positioned with reference to the workpiece by using the first coordinates. In particular, it is possible to make use to this end of a spacing of measuring points that is determined from the first coordinates (for example a length or a diameter of the workpiece). When the spacing has been fixed, it is possible, for example, to determine from the spacing of gray scale values of equal intensity at various fuzzy contours where the contours of the workpiece must be located. It is preferred to make use not only of one dimension for scaling and/or positioning of the information determined from the second coordinate measuring device, but of at least two dimensions. In this case, the dimension can include redundant and/or nonredundant information and/or can be oriented in various and/or identical directions. A redundancy increases the reliability of the scaling and/or positioning, while nonredundant dimensions can be used to scale and/or position in different directions.

In an even more general formulation, it is proposed that measured values of the workpiece (or of a reference object) are measured by the second coordinate measuring device in a spatial region in which an edge or material transition of the workpiece (or of the reference object) is located, the first coordinates measured by the first coordinate measuring device being used for the purpose of assigning a position of the edge or of the material transition and the measured values to one another. In the case of the measurement of a reference object, the first coordinates also relate to the reference object.

The designation "first" coordinate measuring device is not to be understood as meaning that the measurement carried by it or measurements carried out by it takes or take place before the measurement or the measurements of the second coordinate measuring device. On the contrary, the measurements can be carried out in any desired sequence, simultaneously and/or repeatedly. Again, one or more further coordinate measuring devices can be provided. In practice, the time of the measurements can depend on how the measurements are best to be integrated in a production line and/or an assembly line.

The invention can relate, in particular, to the case when the workpiece is brought during the measurements into a changed position with the aid of the two coordinate measuring devices. In this case, the workpiece is moved, for example, from one to the other measuring device, and/or its position is changed such that additional measurement information is available.

In addition, it is possible or, in some circumstances even necessary (for example in the case of coordinate measuring devices with radiation that penetrates the workpiece) for the workpiece also to be moved during the measurement (for example in order to obtain coordinates in a three-dimensional coordinate system).

The first coordinates and/or the second coordinates can be measured in a reference coordinate system or, respectively, in a reference coordinate system.

In one refinement of the invention, the workpiece and at least one reference object are fixedly interconnected, reference coordinates of the reference object(s) being measured by the first coordinate measuring device and by the second coordinate measuring device, and the common set of coordinates being generated by using the reference coordinates. It is possible here for the first and the second coordinate measuring devices to use different reference coordinate systems with respect to which the first and, respectively, second coordinates are measured. For example, this is sensible whenever the workpiece is being measured by one coordinate measuring device in a measuring position in which the reference object(s) cannot be measured in the same way as it/they can be measured by the other coordinate measuring device. In this case, the coordinate measuring devices can refer, for example, to different reference objects or different features of the same reference object in order to determine the reference coordinate system. However, it is preferred for the coordinate measuring devices to refer to the same reference coordinate system, and for the workpiece coordinates to be measured in this coordinate system. This refinement simplifies the production of the common set of coordinates in the coordinate system fixed in the workpiece.

The reference object(s) is/are or will be connected directly and/or indirectly to the workpiece.

In particular, coordinates of the workpiece and reference coordinates of the reference object(s) can be measured by the first coordinate measuring device, by the second coordinate measuring device or by a further coordinate measuring device, information relating to a relative position and orientation of the reference object(s) on the one hand, and of the workpiece on the other hand being obtained, and the common set of coordinates being generated by using the information relating to the relative position and orientation. In the event of an unchanged relative position and orientation, an absolute orientation and/or position of the reference object(s) with the workpiece fastened thereon can then be varied between the measurement of the first coordinates and the measurement of the second coordinates. For example, in order to obtain information relating to the relative position and orientation, on the one hand, coordinates of at least one characteristic shape feature of the workpiece are measured in a coordinate system that is fixed with reference to the respective coordinate measuring device, and on the other hand coordinates of the reference object(s) are measured in the same coordinate system.

The reference object(s) can be any desired suitable objects. Balls are particularly suitable since these can be acquired reliably and precisely (scanned or acquired in another way) from various directions and by various coordinate measuring devices.

In a preferred refinement, which is examined in more detail below with reference to the attached figures, the workpiece is fastened on a pallet during the measurements carried out by the coordinate measuring devices. The pallet has, for example, a dimensionally stable plate on which the workpiece is arranged. Such a plate has the advantage that the workpiece is covered solely on one side. The reference object(s) can, in turn, be fastened on the pallet. The pallet with the workpiece attached thereon can, for example, be moved or transported from one measuring station to another measuring station, and can be aligned as desired in the measuring stations. As an alternative to the pallet, it is possible to fasten on the workpiece another object that is the at least one reference object, or on which the at least one reference object is or will be arranged. If at least one of the measuring devices uses a measuring radiation that transirradiates the material of the workpiece, it is preferred to select for the pallet a material that has a small absorption coefficient for the measuring radiation.

In order, in particular, to reduce the outlay when determining the reference coordinate system in the case of serial measurement of workpieces, the reference object(s) with the workpiece fastened thereon is/are moved into a defined position which is fixed with respect to the first coordinate measuring device and/or to a second coordinate measuring device. At least some of the reference coordinates, the first coordinates and/or the second coordinates are measured, while the reference object(s) is/are located in the defined position. The position of the reference coordinate system is also known from the defined position. If a number of reference objects or shape features of a reference object are located simultaneously in a defined position in each case, an orientation of the reference coordinate system is also known in addition.

The scope of the invention also includes a measuring arrangement for determining coordinates of a workpiece, in which the measuring arrangement exhibits the following:

a first coordinate measuring device for measuring first coordinates of the workpiece, a second coordinate measuring device for measuring second coordinates of the workpiece, and a determining device that is connected to the first and the second coordinate measuring device and is fashioned for generating a common set of coordinates for the workpiece from the first coordinates and from the second coordinates, the common set of coordinates being defined in a coordinate system that is fixedly positioned with reference to the workpiece.

In particular, the measuring arrangement can have a movement device (for example a conveyor belt and/or a roller conveyor) that is fashioned for bringing the workpiece into a measuring position in which the first coordinate measuring device and/or the second coordinate measuring device can measure the first or, respectively, the second coordinates of the workpiece. This movement device can be fashioned, in particular, for bringing a multiplicity of the workpieces into the measuring position one after another.

Further included in the scope of the invention are:

a computer program with program code means that when running on a computer or computer network execute at least that part or those parts of the inventive method in one of its refinements, which part or parts relates or relate to controlling at least one of the measuring devices and/or to processing the measurement information obtained by the measurements. In particular, the program code means can be stored in the form of a computer readable data carrier;

the data carrier with the stored program code means; and a corresponding computer program product. In this case, a computer program product is understood as the program or the program code means as commercial product. It can fundamentally be present in any desired form, for example on paper or a computer readable data carrier, and can, in particular, be distributed over a data transmission network.

BRIEF DESCRIPTION OF THE DRAWINGS

The invention is explained in more detail below with the aid of exemplary embodiments that are represented schematically in the figures. However, the invention is not restricted to the examples. Identical reference numerals in the individual figures in this case denote identical or functionally identical elements, or elements corresponding to one another with regard to their functions. In detail:

FIG. 8 shows a flowchart that illustrates the particularly preferred embodiment of a method for determining workpiece coordinates; and FIG. 9 shows a diagram that illustrates an aspect of the determination of a common set of coordinates from measurements of two coordinate measuring devices.

DETAILED DESCRIPTION OF THE EMBODIMENTS

Figure 1:
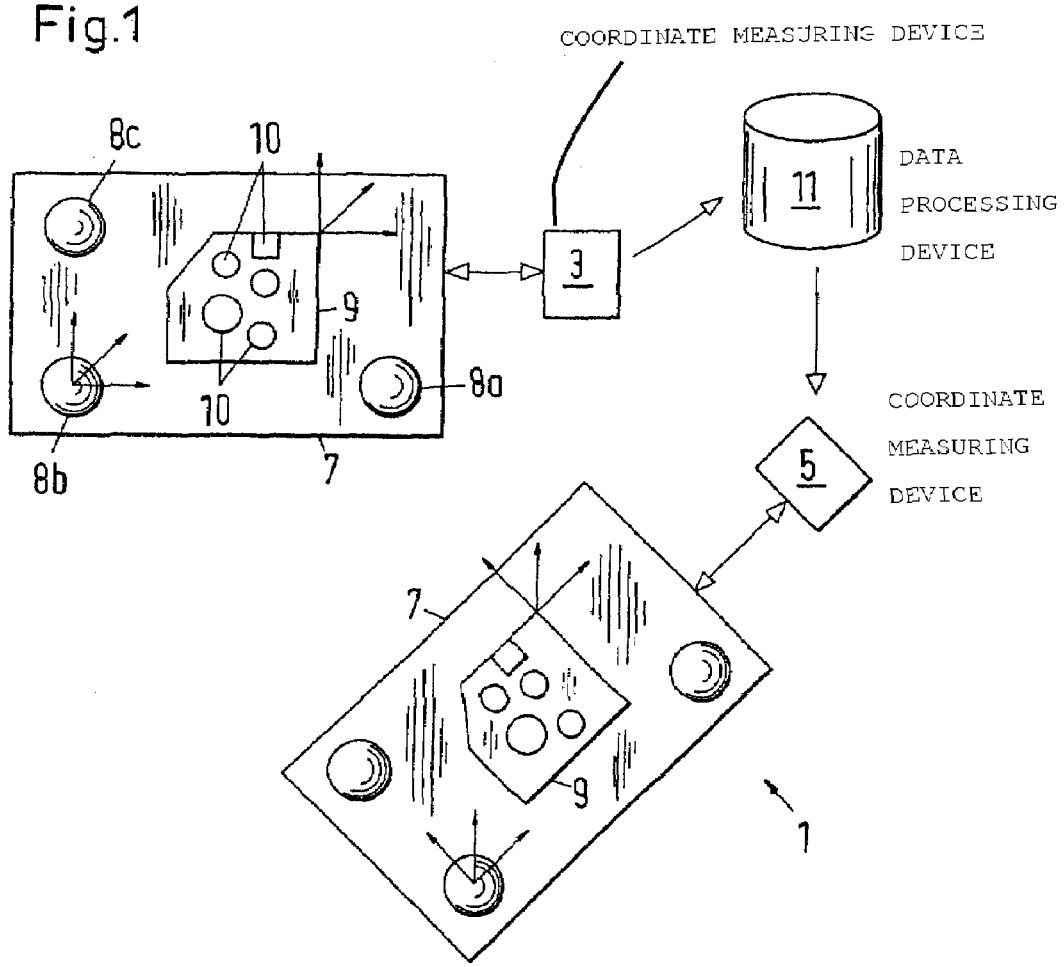
FIG. 1 shows a schematic of a coordinate measuring arrangement having two coordinate measuring devices.

The measuring arrangement 1, illustrated in FIG. 1, for determining workpiece coordinates has a first coordinate measuring device 3 and a second coordinate measuring device 5. The figure shows a workpiece 9 with a plurality of shape features that are denoted by the reference numeral 10. The workpiece 9 is fastened in this example on a pallet-type carrier 7, for example, clamped, bolted down and/or adhesively bonded. Likewise fastened on the carrier 7 are three mutually spaced apart reference objects 8a, 8b, 8c that are respectively arranged in the region of a corner of a rectangular surface of the carrier 7. It is indicated at one (8b) of the reference objects with the aid of three arrows that the three reference objects define a coordinate system that is fixedly positioned with reference to the carrier 7. This coordinate system is denoted in the further description as reference coordinate system and abbreviated as RCS. The reference objects 8 are, for example, balls.

Likewise indicated by three arrows is a coordinate system WCS belonging to a workpiece. Because the workpiece 9 is fastened on the carrier 7, the RCS and the WCS remain in approximately unaltered relative position and relative orientation to one another. It is therefore possible to measure coordinates of the workpiece 9 by means of the various coordinate measuring devices 3, 5 (and, possibly, by means of further coordinate measuring devices) in the RCS, and to convert them into the WCS at a desired point in time.

On the basis of a possible variation in the temperature that can take place during a measurement by means of one of the coordinate measuring devices 3, 5, and/or between measurements by means of various ones of the coordinate measuring devices 3, 5, variations in the relative position and the scalings of the RCS and the WCS can occur. It is therefore proposed to measure the temperature and to calculate the variation by taking account of the coefficients of thermal expansion of the materials of the carrier 7 and of the workpiece 9. It is preferred to integrate a temperature sensor in the carrier 7 for the purpose of measuring the temperature.

The measurement of the coordinates of the workpiece 9 is indicated by arrows in the illustration of FIG. 1, the first coordinate measuring device 3 and the second coordinate measuring device 5 measuring coordinates of the same workpiece 9 simultaneously and/or one after another.

The corresponding measured data can, for example, be transmitted from the first coordinate measuring device 3 to a data processing device 11 that calculates the relative position and orientation of the RCS and the WCS and transmits this information to the second coordinate measuring device 5. Alternatively or in addition, the data processing device 11 can assume further ones of the functions described in this description, for example the conversion of the coordinates determined by the coordinate measuring devices 3, 5 into the WCS and/or the temperature correction.

Figure 2:
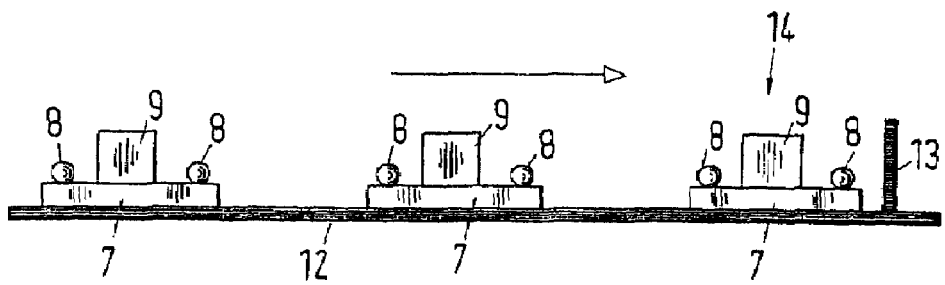
FIG. 2 shows a side view of a conveyor device for conveying a plurality of workpieces one after another to a measuring station in which coordinates of the workpiece are measured.
Figure 3:
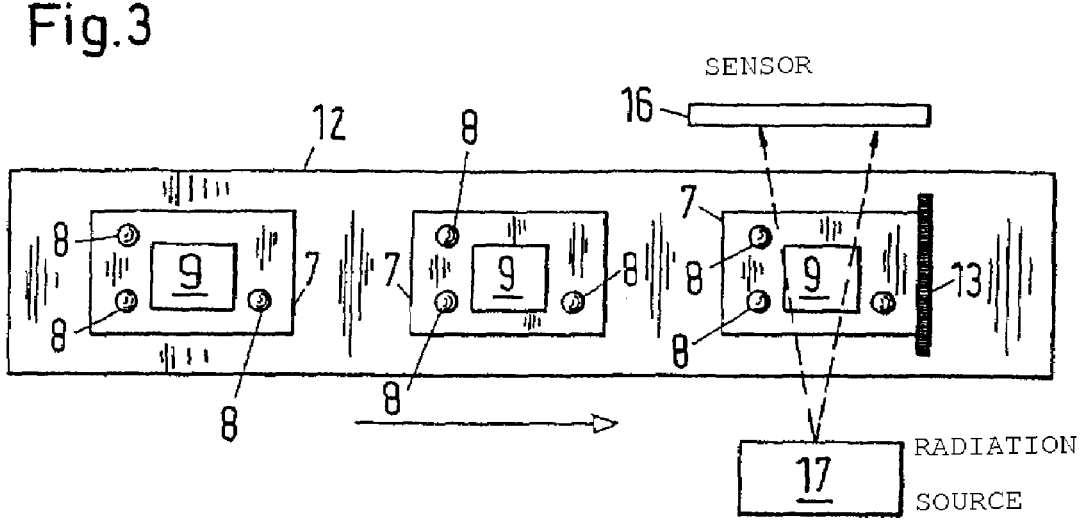
FIG. 3 shows a view from above on to the conveyor device in accordance with FIG. 2, the workpiece being transirradiated in the measuring station by a measuring radiation of a coordinate measuring device.
Figure 4:
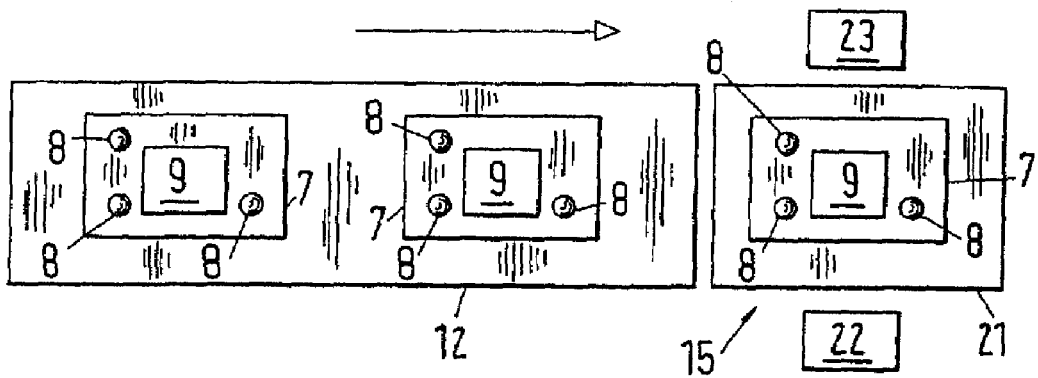
FIG. 4 shows a view from above on to a further conveyor device that conveys the workpieces to a second measuring station in which the workpieces are scanned by a coordinate measuring device of portal design.
Figure 5:
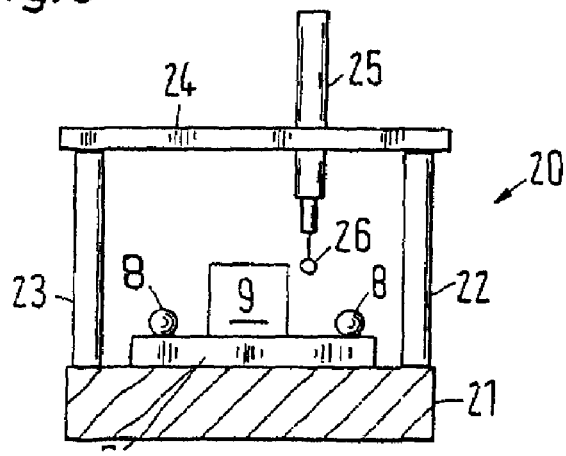
FIG. 5 shows the measuring station in accordance with FIG. 4, in a side view.

FIG. 2 shows in combination with FIG. 3 to FIG. 5 a particularly preferred embodiment of the coordinate measuring arrangement according to the invention. The measuring arrangement has a conveyor device 12 on which a plurality of workpieces 9 are arranged. The workpieces 9 can be, for example, the workpieces 9 illustrated in FIG. 1, which are fitted on a pallet 7 with reference objects 8 fastened thereon. The conveyor device 12 conveys a multiplicity of the workpieces 9 one after another to a first measuring station 14, of which only a stop 13 is illustrated in FIG. 2. Somewhat later than the instantaneous picture illustrated in FIG. 2, one of the workpieces 9 reaches the stop 13 and thus a defined position on the conveyor path. In this position, the workpiece 9 is transirradiated with X-radiation from a radiation source 17 or measured optically. A sensor device 16, arranged downstream of the workpiece 9 from the point of view of the radiation source 17, for taking a two-dimensional image of the incident X-radiation serves the purpose of acquiring information produced on the basis of the attenuation and diffraction of the X-radiation by the workpiece 9. For example, by virtue of the fact that the radiation source 17 is brought into at least one other position from which the X-radiation can reach the workpiece 9 from another direction, further X-ray images are taken and a three-dimensional X-ray image of the workpiece 9 is produced by a data processing system (not shown in FIG. 3). The measuring station 14 is constructed in such a way that the reference objects 8 arranged on the pallet 7 are also included in the X-ray images.

FIG. 4 shows a further conveyor device 12 of the measuring arrangement on which the same workpieces 9 as of the conveyor device shown in FIG. 3 are being conveyed either previously or subsequently to a second measuring station 15. The second measuring station 15 has a measuring table 21 that is arranged spaced apart from the conveyor device 12. From the conveyor device 12 shown in FIG. 4, the workpiece 9 passes, for example, through a movable gripper onto the measuring table 21. As may be seen from FIG. 5. the measuring station 15 is a coordinate measuring device 20 of portal design. Two uprights 22, 23 of the coordinate measuring device 20 that are mounted capable of longitudinal displacement in a horizontal direction support a transverse guide 24 by which a quill 25 is mounted in a fashion capable of transverse movement. The quill 25 and a probe 26 fastened on its lower end can move in a vertical direction such that the probe 26 can reach the desired positions within a measuring range of the coordinate measuring device 20.

In order to measure the coordinates of the workpiece 9, the probe 26 scans the workpiece 9 and the reference objects 8 on the pallet 7 while in contact with the respective surfaces, and three-dimensional coordinates of the workpiece 9 are picked up in a coordinate system defined by the reference objects 8. As is described in yet more detail with reference to FIG. 8 and FIG. 9, it is thereby possible to produce a common set of coordinates in a coordinate system belonging to the workpiece from the coordinates of the workpiece 9 determined in the second measuring station 15. It is further possible, as explained in yet more detail with reference to FIGS. 6 and FIG. 7, to determine the orientation of contours of the workpiece 9 that have been fuzzily picked up in the first measuring station with the accuracy that can be achieved in the second measuring station.

Figure 6:
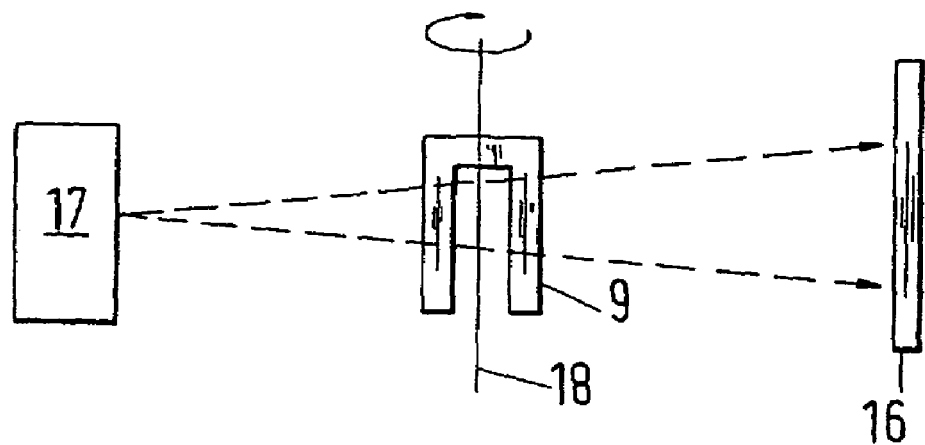
FIG. 6 shows an illustration of the principle of a coordinate measuring device that transirradiates a workpiece that has a cutout.

FIG. 6 shows a radiation source 17 for producing X-radiation (or another radiation that is suitable for penetrating the material of a workpiece 9), a workpiece 9 and a sensor device for taking a two-dimensional image of the impinging radiation. As is indicated by an axis of rotation 18, the workpiece 9 can be rotated, and it is thereby possible to take a multiplicity of two-dimensional images from various viewing angles such that a three-dimensional image of the workpiece 9 can be determined by computation.

The workpiece 9 has a deep and narrow cutout whose surface coordinates cannot be measured or can be measured only in a restricted fashion with coordinate measuring devices that scan the surfaces. It is therefore proposed to combine a measuring device of the type that is illustrated in FIG. 6 with a further measuring device, which scans the surface, and to calculate the desired coordinates of the workpiece from measurements with both measuring devices.

Figure 7:
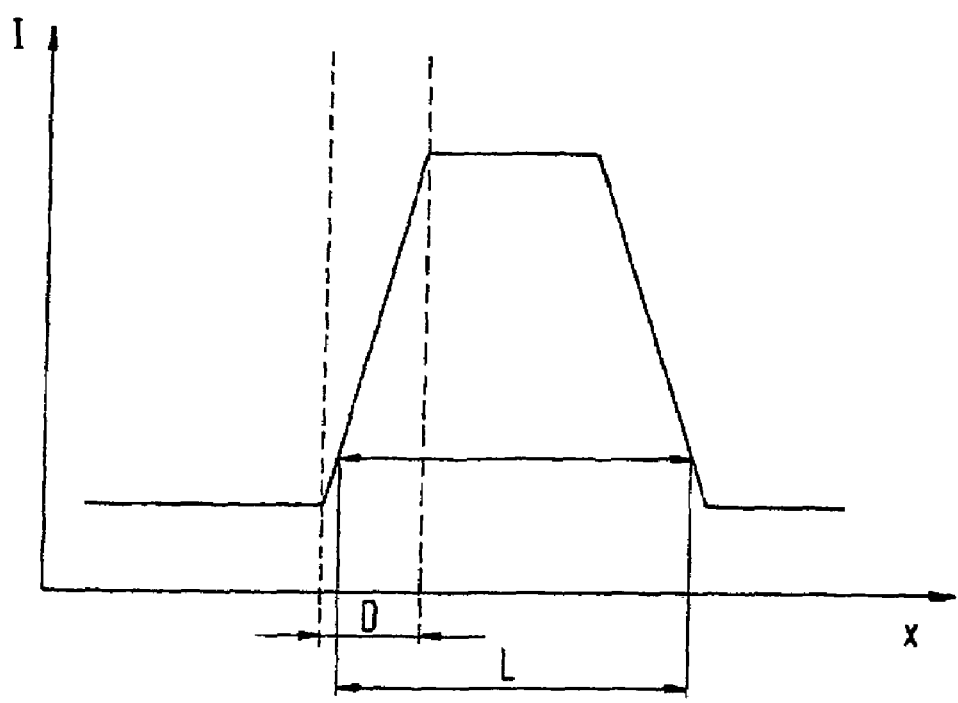
FIG. 7 shows a profile of measured values that were measured by the coordinate measuring device shown in FIG. 6, along a coordinate axis.

FIG. 7 shows results of a three-dimensional spatial radiation absorption field (doing so only in one dimension for reasons of clarity and ease of illustration) that has been calculated from a multiplicity of two-dimensional images of the measuring arrangement shown in FIG. 6. The radiation absorption field corresponds to the radiation absorption effected by the workpiece 9 at the respective point in the three-dimensional space. The absorption I of a workpiece region in the x-direction that has a length L is illustrated in the diagram of FIG. 7. In other words: the material surfaces of the workpiece region lie at a distance of length L from one another in the x-direction. Located between the material surfaces is a material of the workpiece that is homogeneous with regard to the radiation absorption.

As is to be seen from the schematic in FIG. 7, the measured absorption at the material surfaces does not increase or decrease in steps. Rather, the material surfaces are detected only fuzzily by the absorption measurement. There is a fuzziness of breadth D in the x-direction. The actual position of the material surfaces in the x-direction can be determined if the length L is known. For example, it can be assumed for this purpose that the two material surfaces opposite one another have equally fuzzy absorption profiles. In this case, the position of the material surfaces is yielded from the spacing between two absorption values of equal magnitude, the spacing being equal to the length L. The length L is determined, for example, from an exact measurement by a coordinate measuring device that scans the material surfaces. The entire procedure can be denoted as calibration. Alternatively or in addition, the calibration can be carried out with the aid of at least one reference object, for example on material surfaces of the balls 8 fastened on the pallet 7.

A particularly preferred embodiment of the method according to the invention will now be described with the aid of the flowchart of FIG. 8.

As a start, a workpiece is fixedly connected to a plurality of reference objects in a step SO, and in a following step S1 is brought into a first measuring position in which a first coordinate measuring device can measure coordinates of the workpiece and of the reference object. Instead of a plurality of reference objects, it is also possible for a single reference object to be fixedly connected to the workpiece, the reference object having features that can be acquired by a coordinate measuring device (for example shape features and/or optically detectable features) which enable the coordinate measuring device to determine a coordinate system defined by the reference object.

In a following step S2, the workpiece and the reference object are measured by the first coordinate measuring device, and the relative position and orientation of a reference coordinate system RCS defined by the reference objects, on the one hand, and a coordinate system WCS belonging to the workpiece, on the other hand, are determined. The information relating to the relative position and orientation of the RCS and the WCS are stored in a subsequent step S7. The determination of the relative position and orientation can take place alternatively or in addition at a later instant and, in particular, can be carried out by a second coordinate measuring device.

In a step S3 following the step S2, the first coordinate measuring device measures first coordinates of the workpiece in the RCS. If the determination of the relative position and orientation of the RCS and the WCS has already taken place, and if the position of the RCS relative to the first coordinate measuring device has not changed since then, the first coordinates can be measured and/or stored directly in the WCS.

There now follows an optional step S4 in which the workpiece with the reference objects (or the reference object) fastened thereon are/is brought into a changed orientation and/or position. Before the next step S5, the workpiece is brought in any case into an orientation and position so that at least coordinates of a part of the workpiece can be measured by a second coordinate measuring device. Furthermore, the second coordinate measuring device must be capable in this orientation and position of determining the RCS itself (that is to say of producing the reference to its own coordinate system), or determining at least one further, second RCS. Coordinates that are present in various ones of the reference coordinate systems can be converted into a common coordinate system by means of information relating to the reference objects or the reference object.

In particular, two or more different RCS can be determined by one of the coordinate measuring devices, and in each case the corresponding relative positions and orientations of the RCS and of the WCS can be determined. This is advantageous, in particular, whenever the same features of the reference object(s) is/are not accessible to the other coordinate measuring device, and therefore a specific RCS cannot be examined by it.

In the following step S5, the second coordinate measuring device determines the RCS (or the second RCS). As an option, before or after the execution of the following step S6 the second coordinate measuring device is fed the information determined by the first coordinate measuring device and relating to the relative position and orientation of the RCS and of the WCS. In step S6, the second coordinate measuring device now measures second coordinates of the workpiece. Steps S5 and S6 can also be interchanged. If the information relating to the relative position and orientation of the RCS and the WCS is already available before the second coordinates are measured, the second coordinates can be measured and/or stored directly in the WCS.

In a concluding step S8, a common set of coordinates is now generated from the first coordinates and from the second coordinates, specifically in a coordinate system that has been fixed with reference to the workpiece. In particular, in this step the first and second coordinates measured respectively in the RCS or in one of the RCS can be converted into the WCS - by using the information relating to the relative position and orientation of the workpiece and of the reference object(s). Furthermore, it is possible in this case for the above-described calibration to be carried out if required.

It is now to be further explained with reference to FIG. 9 how the information relating to the orientation and position of the reference coordinate system(s) relative to the workpiece ("the relative information" below) can be used. The steps illustrated in FIG. 9 can also respectively be a device implemented as hardware and/or software. Step S11 corresponds in this case to a device for determining the relative information, step S12 corresponds to an evaluation device that executes step S8 of FIG. 8, for example, step S14 corresponds to a data processor of a first coordinate measuring device and step S13 corresponds to a data processor of a second coordinate measuring device.

In accordance with an exemplary embodiment indicated by solid lines in FIG. 9, the second and the first coordinates, respectively, of the workpiece in the or one of the reference coordinate systems are determined in step S13 and step S14. Furthermore, the relative information is determined in step S11. The steps S11, S13 and S14 can be carried out in any desired temporal sequence and/or simultaneously. Again, at least one further coordinate measuring device can be provided that measures third or further coordinates of the workpiece, and/or that carries out the measurements required for determining the relative information. The measured coordinates of the workpiece are processed in step S12 by using the relative information, in order to generate the common set of coordinates.

As indicated by the broken lines in FIG. 9, the relative information can be determined from measured coordinates of the first and/or second coordinate measuring device(s). If the measured coordinates (of the workpiece and of the reference object(s)) include the corresponding information that forms the basis of the relative information, this means that the respective coordinate measuring device can measure the coordinates both in the reference coordinate system and in the coordinate system belonging to the workpiece (or in the coordinate system of the coordinate measuring device) or can convert them into one of the coordinate systems.

Finally, a central evaluation of the measured coordinates is not mandatory for determining the common set of coordinates. Rather, it is possible, for example, for one of the coordinate measuring devices to take over this function.

We claim.

1. A method for determining coordinates of a workpiece (9) fastened to a movable structure, said movable structure having a reference object fastened thereto, comprising:

measuring, using a first coordinate measuring device (3), first coordinates of said workpiece (9) in a first coordinate system;

measuring, using said first coordinate measuring device (3), first coordinates of said reference object;

measuring, using a second coordinate measuring device (5), second coordinates of said workpiece (9) in a second coordinate system;

measuring, using said second coordinate measuring device (5), second coordinates of said reference object in said second coordinate system; and determining, using at least said first coordinates of said reference object and said second coordinates of said reference object, a set of coordinates for said workpiece (9) including coordinate values derived from said first coordinates of said workpiece (9) and said second coordinates of said workpiece (9).

2. The method of claim 1 wherein said first coordinate system is fixed relative to said workpiece (9).

3. The method of claim 1 wherein said movable structure is a pallet.

4. The method of claim 1, wherein the method comprises moving said movable structure from a first coordinate measuring device location after measuring using said first coordinate measuring device to a second coordinate measuring device location and before measuring using said second coordinate measuring device.

5. The method of claim 1 wherein said first coordinate measuring device (3) measures a different property of said workpiece than said second coordinate measuring device (5).

6. The method of claim 1 wherein said first coordinate measuring device is designed to measure coordinates of points on a surface.

7. The method of claim 1 wherein said second coordinate measuring device is designed to transirradiate said workpiece with radiation and derive coordinates for said work piece from measurements of said radiation.

8. The method of claim 1 wherein said measuring, using a second coordinate measuring device (5), second coordinates of said workpiece (9) in a second coordinate system comprises measuring in a spatial region wherein an edge or material interface of at least one of said workpiece and said reference object exists.

9. The method of claim 1 wherein said steps of:
   measuring, using said first coordinate measuring device (3), first coordinates of said workpiece (9) in said first coordinate system;
   measuring, using said first coordinate measuring device (3), first coordinates of said reference object;
   measuring, using said second coordinate measuring device (5), second coordinates of said workpiece (9) in a second coordinate system; and
   measuring, using said second coordinate measuring device (5), second coordinates of said reference object in said second coordinate system;
   occur during at least one of producing and machining said workpiece.

10. The method of claim 1 further comprises sequentially moving additional workpieces into positions for measuring using said first coordinate measuring device and said second coordinate measuring device.

11. The method of claim 1 further comprising:
    measuring with a temperature sensor a temperature of at least one of said workpiece and said movable structure.

12. The method of claim 1 wherein said determining further comprises calculating using coefficient of thermal expansion of materials of at least one of said movable structure and said workpiece.

13. The method of claim 11 further comprising integrating a temperature sensor in said movable structure.

14. The method of claim 1 wherein said determining also comprises measuring, using a temperature sensor, at least one temperature value.

15. The method of claim 14 wherein said temperature sensor is integrated with said movable structure.

16. The method of claim 15 further comprising calculating at least one of position and scaling of said workpiece and said movable structure as a function of said at least one temperature value and at least one thermal coefficient of one material forming at least one of said workpiece and said movable structure.

17. An apparatus for determining coordinates of a workpiece (9) fastened to a movable structure, said movable structure having a reference object fastened thereto, comprising:
    a first coordinate measuring device (3) for measuring first coordinates of said workpiece (9) in a first coordinate system;
    said first coordinate measuring device (3), also for measuring first coordinates of said reference object;
    a second coordinate measuring device (5), for measuring second coordinates of said workpiece (9) in a second coordinate system;
    said second coordinate measuring device (5), also for measuring second coordinates of said reference object in said second coordinate system; and
    a device for determining, using at least said first coordinates of said reference object and said second coordinates of said reference object, a set of coordinates for said workpiece (9) including coordinate values derived from said first coordinates of said workpiece (9) and said second coordinates of said workpiece (9).

18. The apparatus of claim 17 wherein said movable structure is a pallet.

19. A method of making an apparatus for determining coordinates of a workpiece (9) fastened to a movable structure, said movable structure having a reference object fastened thereto, comprising:
    providing a first coordinate measuring device (3) for measuring first coordinates of said workpiece (9) in a first coordinate system;
    said first coordinate measuring device (3), also for measuring first coordinates of said reference object;
    providing a second coordinate measuring device (5), for measuring second coordinates of said workpiece (9) in a second coordinate system;
    said second coordinate measuring device (5), also for measuring second coordinates of said reference object in said second coordinate system; and
    providing a device for determining, using at least said first coordinates of said reference object and said second coordinates of said reference object, a set of coordinates for said workpiece (9) including coordinate values derived from said first coordinates of said workpiece (9) and said second coordinates of said workpiece (9).

20. The method of claim 19 wherein said movable structure is a pallet.

* * * * *